United States Patent [19]
Lee, Jr.

[11] 3,788,292
[45] Jan. 29, 1974

[54] FUEL HEAT EXCHANGER FOR INTERNAL COMBUSTION ENGINE AND METHOD OF USE

[76] Inventor: Seth Lee, Jr., Rt. 1, Coats, N.C. 27521

[22] Filed: Oct. 5, 1972

[21] Appl. No.: 295,243

Related U.S. Application Data

[63] Continuation-in-part of Ser. No. 188,726, Oct. 13, 1971, abandoned.

[52] U.S. Cl... 123/122 A, 123/119 A, 123/122 AA, 123/122 AB, 123/133
[51] Int. Cl. .................. F02m 31/08, F02m 25/06
[58] Field of Search......123/122 R, 122A, 122 AA, 123/122 AB, 133, 119 A

[56] References Cited
UNITED STATES PATENTS

| | | | |
|---|---|---|---|
| 1,415,086 | 5/1922 | Church | 123/122 A |
| 1,660,609 | 2/1928 | Fornaca | 123/122 A |
| 3,667,436 | 6/1972 | Reichhelm | 123/133 X |
| 1,605,382 | 11/1926 | Wirrer | 123/122 AB |
| 2,836,161 | 5/1958 | Primakoff | 123/122 A |
| 1,253,682 | 1/1918 | Good | 123/122 AA |

FOREIGN PATENTS OR APPLICATIONS

| | | | |
|---|---|---|---|
| 405,945 | 11/1924 | Germany | 123/122 A |

Primary Examiner—Al Lawrence Smith
Attorney, Agent, or Firm—J. Gibson Semmes

[57] ABSTRACT

Apparatus for gasifying a fuel and air mixture in an internal combustion engine comprising a baffled inlet chamber for receiving a fuel and air mixture essentially surrounding an exhaust chamber for receiving high temperature exhaust gases, thereby promoting temperatures in the baffled chamber sufficient to gasify said mixture prior to induction to said engine. Methods for gasifying fuels are also taught.

14 Claims, 3 Drawing Figures

INVENTOR
SETH LEE JR.

J Gibson Semmes
ATTORNEY

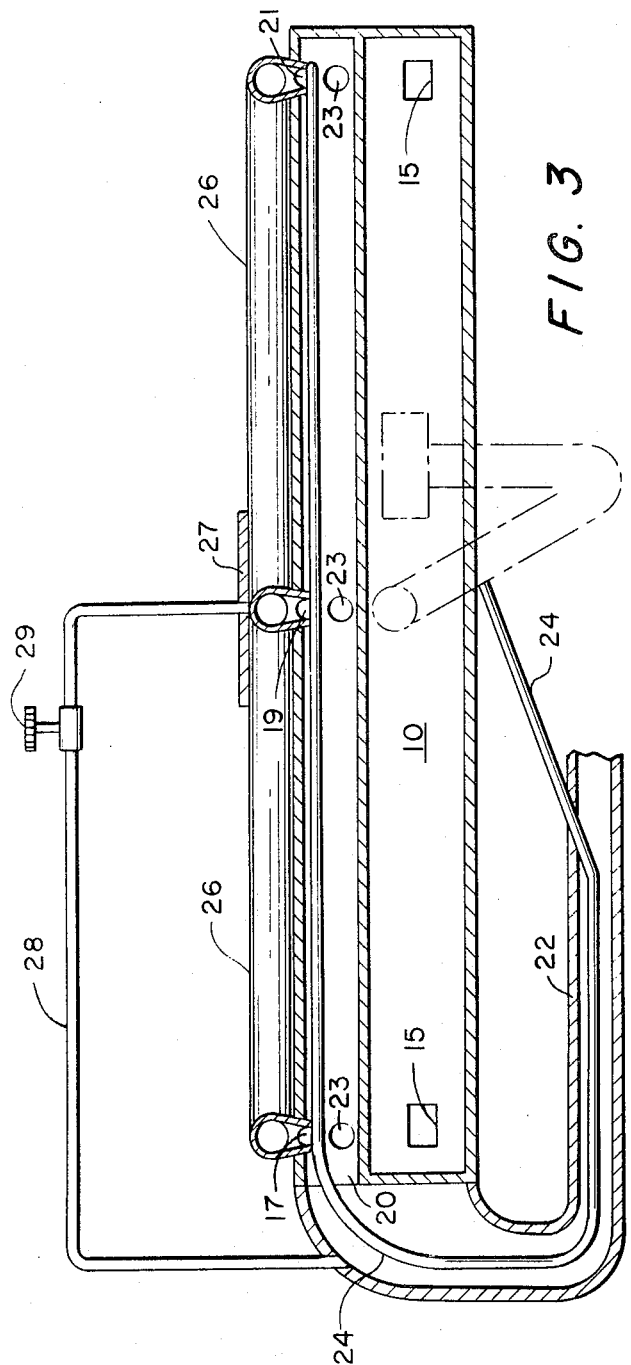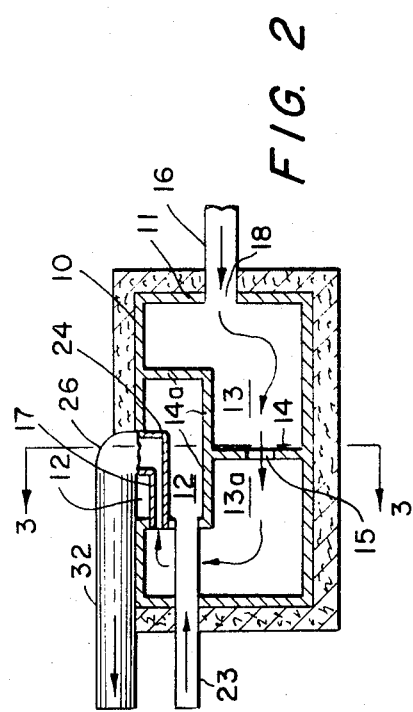

FUEL HEAT EXCHANGER FOR INTERNAL COMBUSTION ENGINE AND METHOD OF USE

REFERENCE TO RELATED APPLICATION

This is a continuation-in-part of my application Ser. No. 188,726, filed Oct. 13, 1971, and entitled "FUEL OIL HEAT EXCHANGER FOR INTERNAL COMBUSTION ENGINE AND METHOD OF use, now abandoned."

BACKGROUND OF THE INVENTION

In the art, it has been known to use the exhaust system of vehicles and explosive engines to heat fuel fed into the same engine. Such systems, as for example that taught by Dixon, U.S. Pat. No. 1,148,891, Giddens, U.S. Pat. No. 1,218,545, and Coffman, U.S. Pat. No. 1,267,185, normally provide for preheating the engine fuel prior to mixture with air. Morse, application No. 961,152, admits use of token amounts of air to prevent excessive explosion in the fuel lines prior to mixing.

BRIEF DESCRIPTION OF THE DRAWINGS

FIG. 2 illustrates the fragmentary cross sectional view of the heat exchanger assembly taken from section lines 2—2 of FIG. 1.

FIG. 3 illustrates a side elevational view of the assembly taken from section lines 3—3 of FIG. 2.

PREFERRED EMBODIMENT OF THE INVENTION

Figure 1:
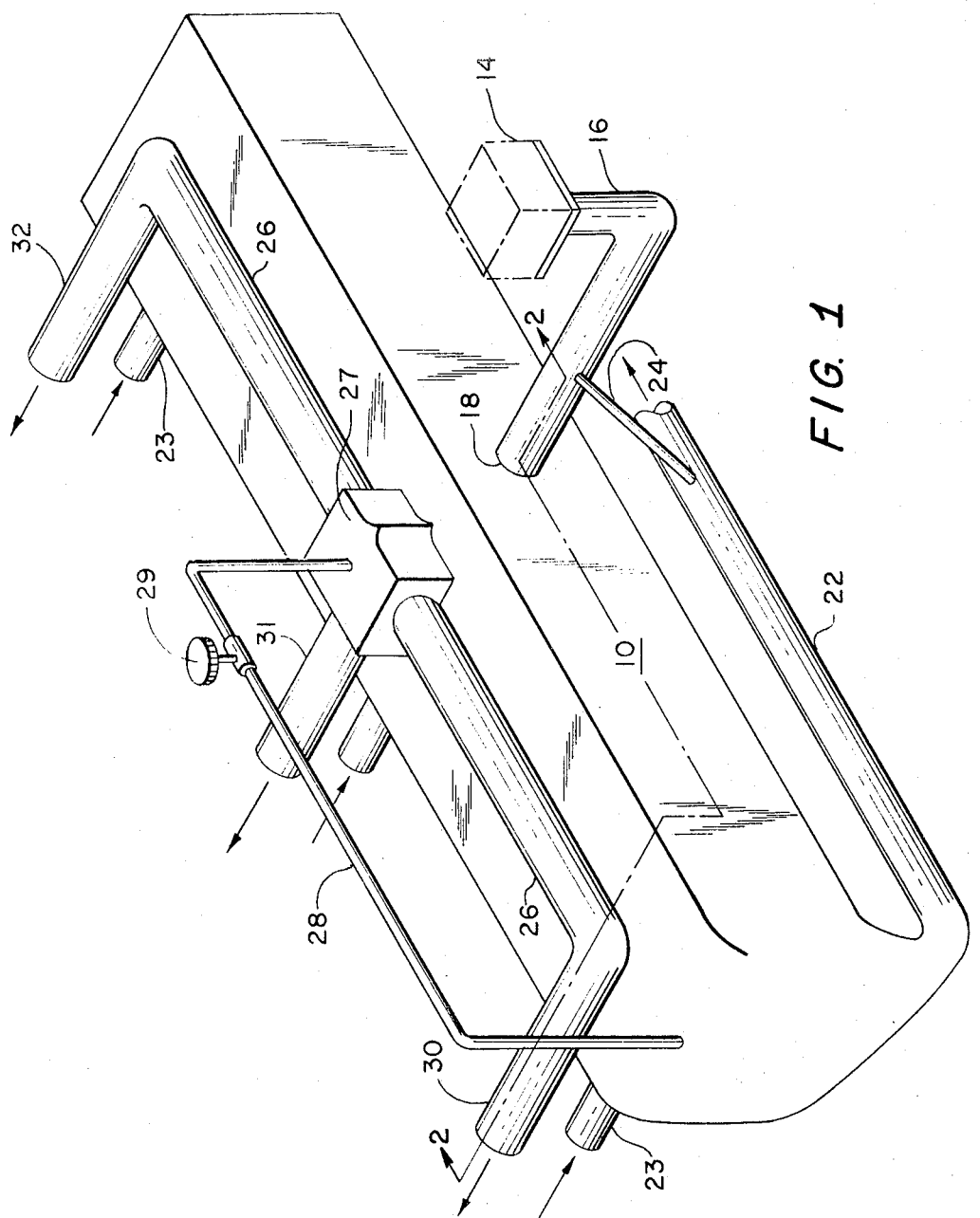
FIG. 1 illustrates a side angular view of the heat exchanger assembly.

It is an object of this invention to provide an engine which will operate to give minimal obnoxious gas emission. It has been discovered that kerosene, light fuel oil or Diesel oil, when heated to temperatures in excess of 580°F., forms a gas that will burn very much like liquified petroleum gas. This gas, when drawn through a conventional gasoline internal combustion engine will ignite in the same way as would a vaporized gasoline. The resulting exhaust gasses are less contaminating to the air than are exhaust gasses from similar engines when gasoline is used as a fuel. When these low grade fuels are used, the fuel oil does not condense within the engine, Gasoline, per se, when introduced simultaneously with air and sequentially heated to 610°-640°F. will gasify and combust with equally good results, especially from the standpoint of reduced exhaust pollutants.

The heating of the fuel oil and gasoline to the requisite temperatures is achieved by the use of a heat exchanger receiving heat from the exhaust of the internal combustion engine. To this end, a heat exchanger as shown in FIG. 1 is illustrated. A block 10 preferably of a metal having high heat conductivity is shown. The block 10 defines a hollowed cavity 12 within, shown in section in FIG. 2. The interior 13, 13A of block 10 is also hollow, section 13 having port 18 through which mixed fuel and air enter from conduction pipe 16. The interior 13 of block 10 actually consists of two elongated chambers 13, 13A, seperated by a common wall 14 and having pneumatic connections or ports 15 between them. Wall 14 extends the length of interior 13 of block 10 with ports 15 being located near the ends of block 10 to provide a long flow path for the fuel and air mixture from essentially centrally located port 18, thereby optimizing heat transfer to the fuel and air from the walls of cavity 12.

The hollowed cavity 12 within block 10 is an elongated chamber having one egress port 20 through which exhaust gasses can flow from the block 10 to exhaust pipe 22 and also shares common walls 14A with chambers 13, 13A. Exhaust gasses from the engine enter into the cavity 12 through ports 23 from the internal combustion engine combustion chambers.

The exhaust gasses emanating from the internal combustion engine are maintained at a relatively superheated condition by virtue of the relatively small cavity 12 and the heat conducting metal block 10. The exhaust gasses expand into the exhaust pipe 22, which has a larger cross-sectional area than cavity 12, reference FIG. 3.

A carburetor 14, shown in phantom lines in FIG 1, is pneumatically connected to fuel and air pipe 16. Fuel and air pipe 16 is constructed of any material having high heat conductivity. Pipe 16 extends to port 18 of hollow section 13 within the block 10. A smaller pipe 24 pneumatically connects the fuel and air pipe 16 from a point in the flow of fuel and air from the carburetor 14, internally through the exhaust pipe 22 and into the hollow cavity 12 within the block 10, FIGS. 2 and 3. Pipe 24 is pneumatically sealed from hollow cavity 12, but runs substantially the length thereof. Due to the relatively superheated condition of the exhaust gases surrounding pipe 24, the fuel and air mixture entering the pipe is gasified therein In adaptation of the system to gasoline consumption, it is desirable to add meter control valves to the pipes 16 and 24 and to employ an exterior connecting pipe from the bend of pipe 16 to block 10.

Connected to the intake valves of the internal combustion engine are ports 30, 31 and 32, all connected pneumatically to distribution line 26. Distribution line 26 rests on top of the exchanger, and is pneumatically connected to pipe 24 within cavity 12 at three locations approximately corresponding to the locations of ports 30, 31, 32.

Pipe 24 is in pneumatic receiving relation to the hollow section 13A by three connections 17, 19 and 21 placed at the center and approximately opposite ends of the pipe 24 within the cavity 12. As indicated in FIG. 2, the volume of pipe 24 is substantially smaller than that of chamber 13A.

By virtue of the extreme temperature levels attained by the combustion gases of the respective fuels, the substantially smaller volumes of pipe 24 and connections 17 and 19 located in cavity 12 are raised to very high temperature levels with the result that the fuel itself becomes gaseous at least by the time it enters distribution line 26, and forms a gaseous mixture with the air. Pneumatically feeding back into distribution line 26 is gas feedback pipe 28 which connects exhaust pipe 22 to distribution line 26 and heating pipe 24 at the safety valve cap 27. This line 28 is not essential in the gasoline operated system.

Heat exchanger block 10 is covered with heat insulation material 11. In actual practice, TEM-MAT insulation for cold climate has been used with success, but it will be appreciated that any comparable substitute could be used.

In the operation of this invention, air is mixed with either a low grade fuel as described, or standard grade gasoline in the internal combustion engine system. This mixture is drawn through the carburetor 14 into pipe 16. The larger quantity of this enriched fuel mixture is pulled through pipe 16 into heating Sections 13, 13A inside the heat exchanger block 10. The mixture flows first through hollow section 13, and then through ports 15 into section 13A. From section 13A, the mixture is drawn through ports 17, 19 to the pipe 24 within exhaust cavity 12. Exhaust from the internal combustion engine is fed through ports 23 into the hollowed cavity 12, thence through port 20, through pipe 22 and into the internal combustion engine exhaust system. A relatively smaller quantity of the enriched fuel mixture is siphoned into the parallel pipe 24 through, but pneumatically insulated from, exhaust gases flowing in countercurrent thereto. This position of the enriched fuel mixture is thermally heated by exhaust gases. Gasses from pipe 16 are ultimately, as described above, joined with the gasses in pipe 24 inside cavity 12 where all the gasses are heated by the exhaust gasses in the cavity 12. This final heating within the cavity 12 helps to provide the fuel and air mixture with sufficient heat to achieve the 580°F., at which temperature the mixture has become completely gasified. In the gasoline system the effective range of applied heat is 610° to 640°F. The optimum for gasification being at approximately 624°F, whereby the omissions contain the lowest content of carbon monoxide, hydrocarbons, carbon dioxides and/or nitrogen oxide gasses.

Further heating is accomplished by the introduction of exhaust gasses from exhaust pipe 22 through exhaust feedback pipe 28 and valve 29 into heating chamber 26 in the heat exchanger block 10. It may be possible to maintain requisite heat levels without the aid of hot exhaust gasses being fed back into the gaseous enriched fuel mixture in heating chamber 26. It may be desirable or necessary, especially in extremely cold climate conditions or shortly after starting up before the internal combustion engine has had a chance to reach operating temperatures, to operate valve 20 and aid the heating of the gaseous enriched fuel mixture by introducing exhaust gasses thereto.

Unusual and satisfactory results have been reached by this invention in experimental tests are reported below:

EXPERIMENT TEST I

A standard, six-cylinder internal combustion engine, American-made, automobile having standard transmission was operation. At 2 feet behind the egress port of the exhaust pipe a carbon monoxide tester was placed. The carbon monoxide tester used was Stock Number 19-0211 as commercially offered to the public by Bacharach Instrument Company, Pittsburgh, Penna. The test tube is supplied with yellow colored potassium pallado-sulfite which reacts with carbon monoxide to form a brownish stain of exceptional visual strenth. The length of the stain is directly proportional to the concentration of carbon monoxide passing through the opened test tube. After 10 seconds of being exposed to the exhaust gasses emanating from the exhaust pipe in this internal combustion engine, using regular commercial gasoline, the test tube was removed and a stain in the contents thereof was directly read to be 0.25 parts per million.

The test run was repeated, except that instead of a common engine, a similar engine which had been modified by the addition of the heat exchanger described herein was used. The The test tube was again placed 2 feet behind the exhaust pipe of the engine run on fuel oil and, after 10 seconds of exposure to the exhaust gasses emanating therefrom, was removed. A reading of the stain imparted to the potassium pallado-sulfite indicated that there was 0 parts per million carbon monoxide from the engine.

EXPERIMENT TEST II

A common, six-cylinder internal combustion engine, American-made, automobile having standard transmission and having its engine modified by the construction of the heat exchanger as described herein was operated using fuel oil. The same carbon monoxide testing tube as indicated in Experimental Test I was placed a distance of two feet behind the exhaust pipe to the engine. The test tube was submitted to these exhaust gasses for a period of 2 minutes, and a stain was read on the test tube indicating 0 parts per mission.

A feature which may be included in this invention is a safety cap 27. Safety cap 27 may be of any available type and forms a part of the boundry of distribution line 26. If the pressures in distribution line 26 should reach dangerous levels, the safety cap 27 will relieve the pressure, causing easily repaired damage to the safety cap 27 and not to the heat exchanger system itself.

EXPERIMENT TEST III

With substantially the same vehicle, vintage 1962, three tests were conducted* (*Standard grade regular automotive gasoline.) at the average temperatures indicated with the results of emission as listed.

A. Average mean temperature 604°F.
  $NOX = 148.75$ PPM
  $CO = 3,160$ PPM
  $HC_2 = 656$ PPM
  $CO^2 = 1.95$ PPM
8 minutes 25 seconds B. Average mean temperature 623°F.
  $NOX = 75.0$ PPM
  $CO = 1,375$ PPM
  $HC_2 = 344.4$ PPM
  $CO^2 = 1.42$ PPM
12 minutes 42 seconds C. Average mean temperature 609°F.
  $NOX = 112.5$ PPM
  $CO = 3,280$ PPM
  $HC = 651.6$ PPM
  $CO^2 = 2.12$ PPM
9 minutes 20 seconds It will be appreciated that the aforementioned, while applying to a vintage automobile of at least ten years of age, meets the requirements of exhaust emissions from 1973 and 1974 model year vehicles, which shall not exceed for hydrocarbon 3.4 grams per vehicle mile; carbon monoxide 39.0 grams per vehicle miles; oxides of nitrogen 3.0 grams per vehicle mile. Reference Federal Register Volume 36, No. 128, Friday, July 2, 1971.

It should be noted that low grade fuel oils can be used satisfactorily at temperatures less than 580°F., although at these lower temperatures, the optimum zero carbon monoxide emission cannot be achieved. During the period of initial start-up at very low temperatures, of course, use of the low grade fuel oils would not be operative. During this period when the engine remains relatively cold, it has been found that bottled liquified petroleum gasses will operate in the engine satisfactorily.

In practice, a fuel switching valve could be installed in the system responsive to the heat of the engine. Thus, when the engine reaches certain pre-determined temperatures, the low grade fuel oil can be fed into the system while the liquified petroleum gas is switched off.

In actual practice, it has been found that a standard engine modified by my new exchanger system can operate using either of five different kinds of fuel; namely, kerosene, Diesel fuel, liquified petroleum gas, regular gasoline and premium or high octane gasoline. This system has been found to be universally adaptable to essentially all gas or other fuel consuming engines, regardless of the use to which they may be put.

While I have described my invention by details of a preferred embodiment and specific drawings, it will be appreciated that certain modifications can be made to the precise placement of critical parts relative to one another without departing from the substance of my invention, which should be limited solely by the claims herein.

I claim:

1. A fuel induction and combustion products exhaust system for an internal combustion engine, comprising:

A. first and second elongated chambers having walls of thermally conductive material and having a first common wall portion therebetween, the first chamber having at least one port for fuel and air induction therethrough;
   B. a plurality of spaced connector ports through the first common wall portion for conveying fuel and air from the first elongated chamber to the second;
   C. a third elongated chamber having walls of thermally conductive material and having a second common wall portion with at least one of the first and second elongated chambers;
   D. first pipe means substantially smaller in volume than the second chamber and of thermally conductive material, for conveying fuel and air mixture from the second elongated chamber through the third elongated chamber to inlet ports of the engine;
   E. means for conveying combustion products from exhaust ports of the engine into the third elongated chamber; and
   F. means for exhausting the combustion products from the third elongated chamber.

2. The system of claim 1, further including:
   G. second pipe means for conveying a fuel and air mixture connected to the at least one fuel and air induction port; and
   H. parallel pipe means pneumatically connected between the first and second pipe means for conveying a portion of the fuel and air mixture directly to the first pipe means, the parallel pipe means being at least partially located within the exhausting means to be heated thereby.

3. The system of claim 2, wherein the parallel pipe means is connected to the first pipe means within the third elongated chamber.

4. The system of claim 1, further including:
   G. second pipe means pneumatically connected between the exhausting means and the first pipe means for conveying a portion of the combustion products back to the inlet ports of the engine; and
   H. valve means located in said second pipe means for regulating flow of combustion products therethrough.

5. The system of claim 1, wherein the first pipe means comprises:
   D1. a section of pipe located within the third elongated chamber and running substantially the length thereof;
   D2. first plurality of pneumatic connection pipes joining the section of pipe in pneumatic receiving relation with the second elongated chamber;
   D3. distribution pipe means located outside the third elongated chamber and having a second plurality of pneumatic connection pipes joining the distribution pipe in pneumatic receiving relation to the section of pipe within the third elongated chamber; and
   D4. means for pneumatically connecting the distribution pipe to the inlet ports of the engine.

6. The system of claim 5, further including:
   G. second pipe means for conveying a fuel and air mixture connected to the at least one fuel and air induction port; and
   H. parallel pipe means pneumatically connected between the section of pipe located within the third elongated chamber and the second pipe means for conveying a portion of the fuel and air mixture directly to the section of pipe, the parallel pipes means being at least partially located within the exhausting means to be heated thereby.

7. The system of claim 1, wherein the first common wall portion has opposite ends and there are two spaced connector ports, one at each of the opposite ends.

8. A method of gasifying a hydrocarbon fuel for use in an internal combustion engine, comprising the steps of:
   A. mixing the fuel with air to form a combustible mixture;
   B. drawing the combustible mixture through a first pipe, into a first chamber for expansion therein;
   C. heating the mixture as it expands in the first chamber;
   D. drawing the mixture through a plurality of ports joining the first chamber to a second chamber for expansion therein;
   E. further heating the mixture as it expands in the second chamber;
   F. drawing the mixture through a plurality of ports in the second chamber into a second pipe substantially smaller in volume than the second chamber; and
   G. heating the second pipe to gasify the mixture therein prior to induction into the engine.

9. The method of claim 8, further comprising the step of controllably mixing a portion of the exhaust gases from the engine with the mixture in the second pipe.

10. The method of claim 8, further comprising the steps of:
    H. simultaneously drawing a lesser portion of the combustible mixture through a third pipe in parallel with drawing a greater portion of the combustible mixture into the first chamber;
    I. heating the lesser portion as it flows through the third pipe; and J. subsequently passing the lesser portion into the second pipe to be mixed therein with the greater portion.

11. The method of claim 10, wherein the heating steps are performed by exposing the first and second chambers and the second and third pipes to the exhaust gases from the engine.

12. The method of claim 8 wherein the heating steps are performed by exposing the first and second chambers and the second pipe to the exhaust gases from the engine.

13. The method of claim 8, wherein the fuel is gasoline and the second pipe is heated to a temperature of from 610° to 640°F.

14. The method of claim 8, wherein the fuel is kerosene and the second pipe is heated to a minimum temperature of 580°F.

* * * * *